US 11,732,120 B2

(12) United States Patent
Johnson (10) Patent No.: US 11,732,120 B2
(45) Date of Patent: Aug. 22, 2023

(54) UV STABLE FIBER-REINFORCED POLYMER COMPOSITION

(71) Applicant: Ticona LLC, Florence, KY (US)

(72) Inventor: Aaron H. Johnson, Winona, MN (US)

(73) Assignee: Ticona LLC, Florence, KY (US)

( * ) Notice: Subject to any disclaimer, the term of this patent is extended or adjusted under 35 U.S.C. 154(b) by 61 days.

(21) Appl. No.: 17/541,329

(22) Filed: Dec. 3, 2021

(65) Prior Publication Data

US 2022/0186005 A1    Jun. 16, 2022

Related U.S. Application Data

(60) Provisional application No. 63/126,028, filed on Dec. 16, 2020.

(51) Int. Cl.
*C08L 23/12* (2006.01)
*C08K 3/014* (2018.01)
*C08K 3/04* (2006.01)
*C08K 7/14* (2006.01)

(52) U.S. Cl.
CPC .............. *C08L 23/12* (2013.01); *C08K 3/014* (2018.01); *C08K 3/04* (2013.01); *C08K 7/14* (2013.01); *C08L 2205/025* (2013.01); *C08L 2207/04* (2013.01)

(58) Field of Classification Search
None
See application file for complete search history.

(56) References Cited

U.S. PATENT DOCUMENTS

| | | | |
|---|---|---|---|
| 3,322,718 | A | 5/1967 | Jacob |
| 3,409,587 | A | 11/1968 | Mills |
| 3,558,554 | A | 1/1971 | Kuriyama et al. |
| 3,629,194 | A | 12/1971 | Onishi et al. |
| 4,206,111 | A | 6/1980 | Valdiserri et al. |
| 4,261,880 | A | 4/1981 | Fujii et al. |
| 4,403,053 | A | 9/1983 | Lewis |
| RE32,772 | E | 10/1988 | Hawley |

(Continued)

FOREIGN PATENT DOCUMENTS

| | | |
|---|---|---|
| CN | 103788470 A | 5/2014 |
| CN | 104419015 A | 3/2015 |

(Continued)

OTHER PUBLICATIONS

Ghasernzadeh-Barvarz et al., "Mechanical, water absorption, and aging properties of polypropylene/flax/Glass fiber hybrid composites," *Journal of Composite Materials*, vol. 49, No. 30, Jan. 22, 2015, pp. 3781-3798 (1-18).

(Continued)

*Primary Examiner* — Richard A Huhn
(74) *Attorney, Agent, or Firm* — Dority & Manning, P.A.

(57) ABSTRACT

A fiber-reinforced polymer composition that contains a polymer matrix, stabilizer system, and a plurality of long reinforcing fibers that are distributed within the polymer matrix is provided. The stabilizer system comprises an antioxidant, an ultraviolet light stabilizer, and a carbon material that includes carbon particles. The polymer composition defines a surface that exhibits a ΔE value of from about 0.6 to about 3 after being exposed to UV light at a total exposure level of 2,500 kJ/m² according to SAE J2527_2017092.

43 Claims, 4 Drawing Sheets

(56) References Cited

U.S. PATENT DOCUMENTS

| | | |
|---|---|---|
| 5,081,170 A | 1/1992 | Yagi et al. |
| 5,155,153 A | 10/1992 | Neri et al. |
| 5,166,239 A | 11/1992 | Memon et al. |
| 6,518,344 B1 | 2/2003 | Chundury et al. |
| 6,538,056 B1 | 3/2003 | Webster |
| 6,664,317 B2 | 12/2003 | King, III |
| 6,774,170 B2 | 8/2004 | Webster |
| 7,148,278 B2 | 12/2006 | Bulpett et al. |
| 7,262,235 B2 | 8/2007 | Bulpett et al. |
| 7,375,149 B2 | 5/2008 | Rotzinger et al. |
| 7,771,646 B2 | 8/2010 | Clauss et al. |
| 8,008,388 B2 | 8/2011 | Chundury et al. |
| 8,633,265 B2 | 1/2014 | Hurst et al. |
| 9,233,486 B2 | 1/2016 | Regan et al. |
| 9,278,472 B2 | 3/2016 | Eastep et al. |
| 9,340,656 B2 | 5/2016 | Mulholland |
| 9,428,637 B2 | 8/2016 | Kohler et al. |
| 10,023,716 B2 | 7/2018 | Mulholland |
| 10,266,673 B2 | 4/2019 | Shimizu et al. |
| 10,975,233 B2 | 4/2021 | Kanuteh et al. |
| 10,982,059 B2 | 4/2021 | Kanuteh et al. |
| 11,129,312 B2 | 9/2021 | Grinsteinner |
| 11,466,130 B2 | 10/2022 | Grinsteinner |
| 2002/0086743 A1 | 7/2002 | Bupett et al. |
| 2007/0082199 A1 | 4/2007 | Schweizer et al. |
| 2007/0295689 A1* | 12/2007 | Clauss .................. B41M 5/267 |
| | | 524/421 |
| 2012/0184651 A1* | 7/2012 | Hurst ...................... C08L 25/10 |
| | | 524/99 |
| 2014/0073731 A1 | 3/2014 | Inamdar |
| 2019/0270260 A1 | 9/2019 | Johnson et al. |
| 2020/0190304 A1 | 6/2020 | Kenny et al. |
| 2021/0221967 A1 | 7/2021 | Kanuteh et al. |
| 2021/0221991 A1 | 7/2021 | Kanuteh et al. |
| 2022/0185995 A1 | 6/2022 | Eastep et al. |

FOREIGN PATENT DOCUMENTS

| | | |
|---|---|---|
| WO | WO 02/46503 A1 | 6/2002 |
| WO | WO 2019/002315 A1 | 1/2019 |
| WO | WO 2019/064203 A1 | 4/2019 |

OTHER PUBLICATIONS

Yadav et al., "Functional finishing in cotton fabrics using zinc oxide nanoparticles," *Bull. Mater. Sci.*, vol. 29, No. 6, Nov. 2006, pp. 641-645.

International Search Report and Written Opinion for PCT/US2021/061783 dated Feb. 15, 2022, 6 pages.

\* cited by examiner

UV STABLE FIBER-REINFORCED POLYMER COMPOSITION

CROSS REFERENCE TO RELATED APPLICATION

The present application claims filing benefit of U.S. Provisional Patent Application Ser. No. 63/126,028 having a filing date of Dec. 16, 2020, which is incorporated herein by reference in its entirety.

BACKGROUND OF THE INVENTION

Long fiber-reinforced polymer compositions are often employed in molded parts to provide improved mechanical properties. Typically, such compositions are formed by a process that involves extruding a polymer through an impregnation die and onto a plurality of continuous lengths of reinforcing fibers. The polymer and reinforcing fibers are pulled through the die to cause thorough impregnation of individual fiber strands with the resin. Despite their benefits, one of the common issues that manufacturers face when attempting to use such materials in certain product applications (e.g., automotive components) is that they tend to exhibit surface defects due to the presence of un-wet fiber bundles, wispy fibers on the surface of the part, visual flow lines, degraded material, and so forth. Such color defects can become particularly noticeable after exposure to ultraviolet light and result in an undesirable change in the color of the part. As such, a need currently exists for a fiber-reinforced polymer composition with an improved surface appearance and color stability, particularly after exposure to ultraviolet light.

SUMMARY OF THE INVENTION

In accordance with one embodiment of the present invention, a fiber-reinforced polymer composition is disclose that comprises a polymer matrix; a stabilizer system that includes an antioxidant, an ultraviolet light stabilizer, and a carbon material that includes carbon particles; and a plurality of long reinforcing fibers that are distributed within the polymer matrix. The polymer matrix contains a thermoplastic polymer and the polymer matrix constitutes from about 30 wt. % to about 90 wt. % of the composition. The fibers constitute from about 10 wt. % to about 70 wt. % of the composition. Furthermore, the polymer composition defines a surface that exhibits a ΔE value of from about 0.6 to about 3 after being exposed to UV light at a total exposure level of 2,500 kJ/m² according to SAE J2527_2017092, the ΔE value being determined according to the following equation:

$$\Delta E = [(\Delta L^*)^2 + (\Delta a^*)^2 + (\Delta b^*)^2]^{1/2}$$

wherein, ΔL* is the luminosity value L* of the surface following UV exposure subtracted from the luminosity value L* of the surface prior to UV exposure, Δa* is the red/green axis value a* of the surface following UV exposure subtracted from the red/green axis value a* of the surface prior to UV exposure; and Δb* is the yellow/blue axis value b* of the surface following UV exposure subtracted from the yellow/blue axis value b* of the surface prior to UV exposure, wherein L*, a*, and b* are calculated using CIELAB units according to ASTM D2244-16.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Repeat use of reference characters in the present specification and drawings is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention.

Generally speaking, the present invention is directed to a fiber-reinforced composition for use in a shaped part (e.g., molded part) that contains a plurality of long reinforcing fibers distributed within a polymer matrix. Long fibers may, for example, constitute from about 10 wt. % to about 70 wt. %, in some embodiments from about 15 wt. % to about 65 wt. %, and in some embodiments, from about 20 wt. % to about 60 wt. % of the composition. Likewise, the polymer matrix typically constitutes from about 30 wt. % to about 90 wt. %, in some embodiments from about 35 wt. % to about 85 wt. %, and in some embodiments, from about 40 wt. % to about 80 wt. % of the composition. The composition also contains a stabilizer system that includes a synergistic combination of an antioxidant, UV stabilizer, and carbon material.

Through selective control over the particular nature and concentration of each of these components, the present inventors have discovered that the resulting composition may be capable of maintaining its color even after exposure to ultraviolet light. Such UV color stability can be quantified by measuring the light absorbance of a surface of the composition (or a shaped part formed therefrom) with a spectrophotometer before and after exposure to ultraviolet light (e.g., total exposure level of 1,250 hours or 2,500 kJ/m²). The ultraviolet light may be supplied using a xenon arc weatherometer (e.g., Ci4000) according to SAE J2527_2017092 (exterior cycle), which employs a light cycle and dark cycle as follows: 40 minutes of light with no spray, 20 minutes of light with front specimen spray, 60 minutes of light with no spray, and 60 minutes of dark with back specimen spray). The light cycle is conducted with 0.55 W/m² irradiation, 70° C. black panel temperature, and 50% relative humidity, and the dark cycle is conducted at 38° C. black panel temperature and relative humidity of 95%. Color measurement may be performed using a spectrophotometer (e.g., DataColor 600) and color coordinates may be calculated using CIELAB units according to ASTM D2244-16 under illuminant D65, 10° observer with specular mode included. This method defines three color coordinates L*, a*, and b*, which correspond to three characteristics of a perceived color based on the opponent theory of color perception and are defined as follows:

L*=Luminosity value ranging from 0 to 100, where 0=black and 100=white;

a*=Red/green axis, ranging from −150 to 100; positive values are reddish and negative values are greenish; and b*=Yellow/blue axis, ranging from −100 to 100; positive values are yellowish and negative values are bluish.

Because CIELAB color space is somewhat visually uniform, the delta value (ΔE) may be calculated that represents the total absolute color difference between two colors (e.g., prior to and following UV aging, without washing) as perceived by a human using the following equation:

$$\Delta E = [(\Delta L^*)^2 + (\Delta a^*)^2 + (\Delta b^*)^2]^{1/2}$$

wherein, ΔL* is the luminosity value of the surface following UV exposure subtracted from the luminosity value of the surface prior to UV exposure, Δa* is the red/green axis value of the surface following UV exposure subtracted from the red/green axis value of the surface prior to UV exposure; and Δb* is the yellow/blue axis value of the surface following UV exposure subtracted from the yellow/blue axis value of the surface prior to UV exposure. In CIELAB color space, each ΔE unit is approximately equal to a "just noticeable" difference between two colors and is therefore a good measure for an objective device-independent color specification system that may be used for the purpose of expressing differences in color. A surface of the polymer composition (or a shaped part formed therefrom) of the present invention may, for instance, exhibit a ΔE value of from about 0.6 to about 3, in some embodiments from about 0.7 to about 2.5, in some embodiments from about 0.8 to about 2, and in some embodiments, from about 0.9 to about 1.4, after being exposed to ultraviolet light at a total exposure level of 2,500 kJ/m² according to SAE J2527_2017092.

Conventionally, it was believed that compositions having such a stable surface appearance after exposure to ultraviolet light would not also possess good mechanical properties. The present inventors have discovered, however, that the polymer composition is able to maintain excellent mechanical properties. For example, the polymer composition may exhibit a Charpy notched impact strength of about 15 kJ/m² or more, in some embodiments from about 20 to about 80 kJ/m², and in some embodiments, from about 30 to about 60 kJ/m², measured at according to ISO Test No. 179-1:2010) (technically equivalent to ASTM D256-10e1) at various temperatures, such as −30° C., 23° C., or 80° C. The tensile and flexural mechanical properties may also be good. For example, the polymer composition may exhibit a tensile strength of from about 20 to about 300 MPa, in some embodiments from about 30 to about 200 MPa, and in some embodiments, from about 40 to about 150 MPa; a tensile break strain of about 0.5% or more, in some embodiments from about 0.6% to about 5%, and in some embodiments, from about 0.7% to about 2.5%; and/or a tensile modulus of from about 3,500 MPa to about 20,000 MPa, in some embodiments from about 6,000 MPa to about 15,000 MPa, and in some embodiments, from about 8,000 MPa to about 15,000 MPa. The tensile properties may be determined in accordance with ISO Test No. 527-1:2019 (technically equivalent to ASTM D638-14) at −30° C., 23° C., or 80° C. The polymer composition may also exhibit a flexural strength of from about 50 to about 500 MPa, in some embodiments from about 80 to about 400 MPa, and in some embodiments, from about 100 to about 250 MPa; a flexural break strain of about 0.5% or more, in some embodiments from about 0.6% to about 5%, and in some embodiments, from about 0.7% to about 2.5%; and/or a flexural modulus of from about 3,500 MPa to about 20,000 MPa, in some embodiments from about 3,000 MPa to about 15,000 MPa, and in some embodiments, from about 6,000 MPa to about 12,000 MPa. The flexural properties may be determined in accordance with ISO Test No. 178:2019 (technically equivalent to ASTM D790-17) at −30° C., 23° C., or 80° C.

The present inventors have also discovered that the polymer composition is not highly sensitive to aging at high temperatures. For example, the composition may be aged in an atmosphere having a temperature of from about 100° C. or more, in some embodiments from about 120° C. to about 200° C., and in some embodiments, from about 130° C. to about 180° C. (e.g., 150° C.) for a time period of about 100 hours or more, in some embodiments from about 300 hours to about 3000 hours, and in some embodiments, from about 400 hours to about 2500 hours (e.g., 500 or 1,000 hours). Even after aging, the mechanical properties (e.g., impact strength, tensile properties, and/or flexural properties) may remain within the ranges noted above. For example, the ratio of a particular mechanical property (e.g., Charpy unnotched impact strength, tensile strength, flexural strength, etc.) after "aging" at 150° C. for 1,000 hours to the initial mechanical property prior to such aging may be about 0.6 or more, in some embodiments about 0.7 or more, and in some embodiments, from about 0.8 to 1.0. Similarly, the polymer composition is not highly sensitive to ultraviolet light. For example, the polymer composition may be exposed to one or more cycles of ultraviolet light as noted above. Even after such exposure (e.g., total exposure level of 2,500 kJ/m² according to SAE J2527_2017092), the mechanical properties (e.g., impact strength, tensile strength, flexural strength, etc.) and the ratio of such properties may remain within the ranges noted above.

The polymer composition may also exhibit a low degree of emissions of volatile organic compounds. As used herein, the term "volatile compounds" or "volatiles" generally refer to organic compounds that have a relatively high vapor pressure. For example, the boiling point of such compounds at atmospheric pressure (1 atmosphere) may be about 80° C. or less, in some embodiments about 70° C. or less, and in some embodiments, from about 0° C. to about 60° C. One example of such a compound is 2-methyl-1-propene. Contrary to conventional thought, the resulting composition can exhibit low volatile emissions through selective control over the nature of the materials employed in the polymer composition and the particular manner in which they are combined together. For example, the polymer composition may exhibit a total volatile content ("VOC") of about 100 micrograms equivalent carbon per gram of the composition ("μgC/g") or less, in some embodiments about 70 μg/g or less, in some embodiments about 50 μg/g or less, and in some embodiments, about 40 μg/g or less, as determined in accordance with VDA 277:1995. The composition may also exhibit a toluene equivalent volatile content ("TVOC") of about 250 micrograms equivalent toluene per gram of the composition ("μg/g") or less, in some embodiments about 150 μg/g or less, and in some embodiments, about 100 μg/g or less, as well as a fogging content ("FOG") of about 500 micrograms hexadecane per gram of the composition ("μg/g") or less, in some embodiments about 350 μg/g or less, and in some embodiments, about 300 μg/g or less, each of which may be determined in accordance with VDA 278:2002.

Figure 3:
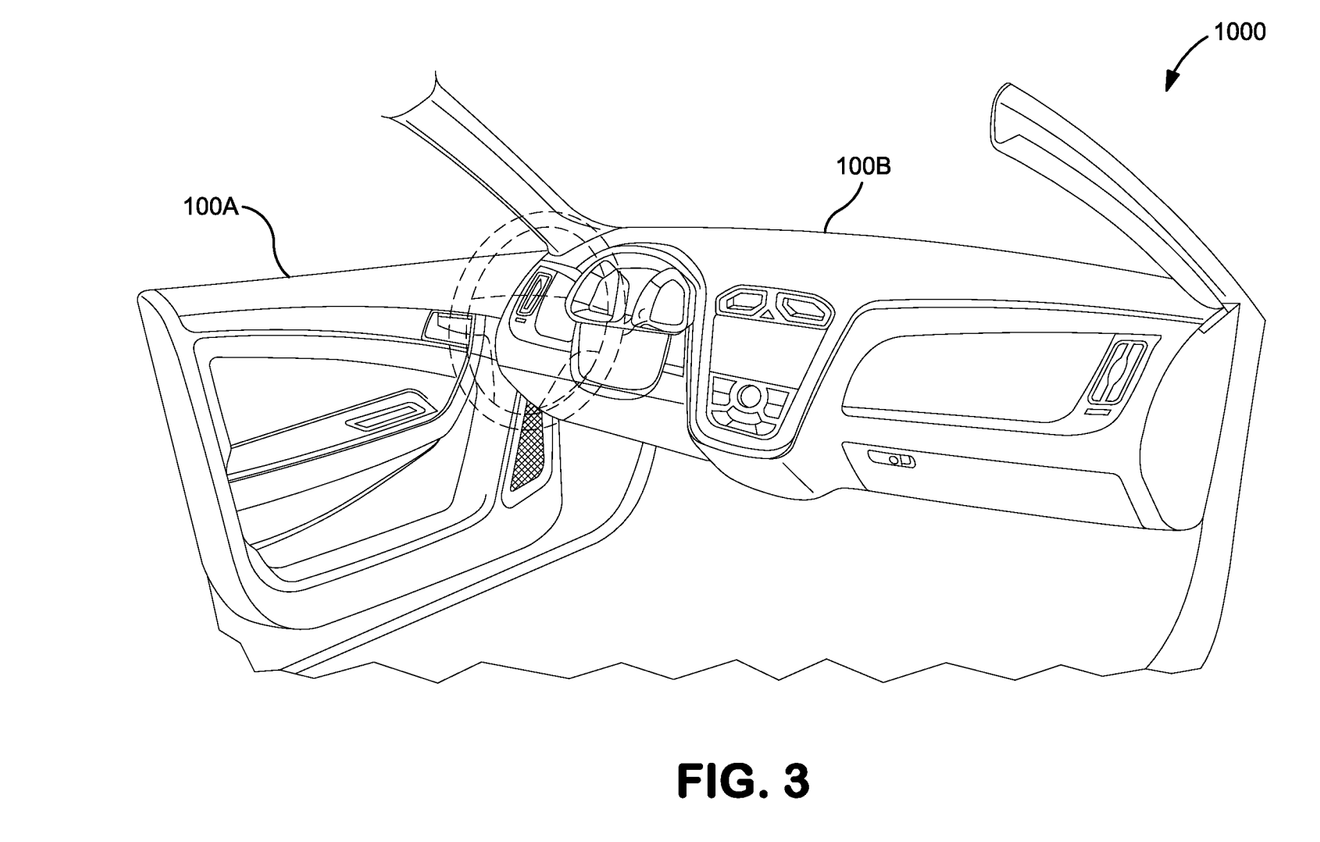
FIG. 3 is a perspective view of one embodiment of an automotive interior that may contain one or more parts formed from the fiber-reinforced polymer composition of the present invention.
Figure 4:
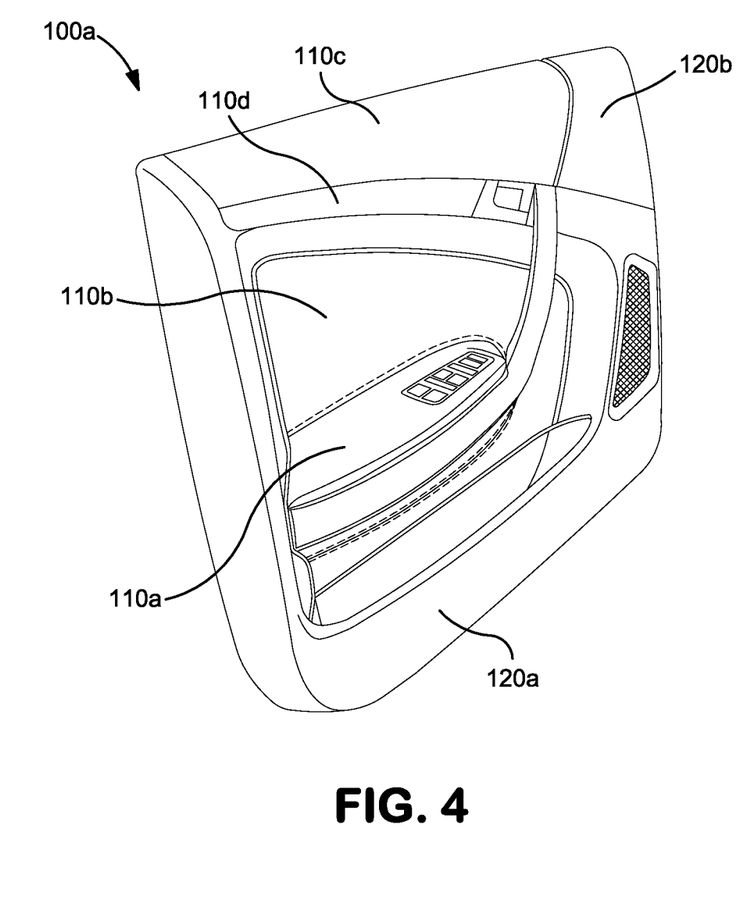
FIG. 4 is a perspective view of the door module shown in FIG. 3 and that may be formed from the fiber-reinforced polymer composition of the present invention.

In light of the properties discussed above, such as good surface appearance, good mechanical strength and flexibility, and low emissions, the polymer composition is particularly suitable for use in interior and exterior automotive parts (e.g., injection molded parts). Suitable exterior automotive parts may include fan shrouds, sunroof systems, door panels, front end modules, side body panels, underbody shields, bumper panels, cladding (e.g., near the rear door license plate), cowls, spray nozzle body, capturing hose assembly, pillar cover, rocker panel, etc. Likewise, suitable interior automotive parts that may be formed from the polymer composition of the present invention may include, for instance, pedal modules, instrument panels (e.g., dashboards), arm rests, consoles (e.g., center consoles), seat structures (e.g., backrest of the rear bench or seat covers), interior modules (e.g., trim, body panel, or door module), lift gates, interior organizers, step assists, ash trays, glove boxes, gear shift levers, etc. Referring to FIG. 3, for example, one embodiment of an automotive interior 1000 is shown having an interior door module 100a and an instrument panel 100b, one or both of which may be formed entirely or in part from the polymer composition of the present invention. FIG. 4, for example, depicts a particular embodiment of the interior automotive module 100a that includes an arm rest component 110a, first padded component 110b, second padded component 110c, and trim component 110d. The door module 100a can also include a base component 120a and an accent component 120b. The base component 120a may be formed around each of the components of the automotive module 100a.

Various embodiments of the present invention will now be described in more detail.

I. Polymer Matrix

A. Thermoplastic Polymers

The polymer matrix functions as a continuous phase of the composition and contains one or more thermoplastic polymers, such as propylene polymers, polyamides, polyarylene sulfides, polyaryletherketones (e.g., polyetheretherketone), polyimides, etc. Propylene polymers are particularly suitable. In this regard, any of a variety of propylene polymers or combinations of propylene polymers may generally be employed in the polymer matrix, such as propylene homopolymers (e.g., syndiotactic, atactic, isotactic, etc.), propylene copolymers, and so forth. In one embodiment, for instance, a propylene polymer may be employed that is an isotactic or syndiotactic homopolymer. The term "syndiotactic" generally refers to a tacticity in which a substantial portion, if not all, of the methyl groups alternate on opposite sides along the polymer chain. On the other hand, the term "isotactic" generally refers to a tacticity in which a substantial portion, if not all, of the methyl groups are on the same side along the polymer chain. Such homopolymers may have a melting point of from about 160° C. to about 170° C. In yet other embodiments, a copolymer of propylene with an α-olefin monomer may be employed. Specific examples of suitable α-olefin monomers may include ethylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. The propylene content of such copolymers may be from about 60 mole % to about 99 mole %, in some embodiments from about 80 mole % to about 98.5 mole %, and in some embodiments, from about 87 mole % to about 97.5 mole %. The α-olefin content may likewise range from about 1 mole % to about 40 mole %, in some embodiments from about 1.5 mole % to about 15 mole %, and in some embodiments, from about 2.5 mole % to about 13 mole %.

Any of a variety of known techniques may generally be employed to form the propylene homopolymers and propylene/α-olefin copolymers. For instance, olefin polymers may be formed using a free radical or a coordination catalyst (e.g., Ziegler-Natta). Typically, however, the copolymer is formed from a single-site coordination catalyst, such as a metallocene catalyst, to help minimize the degree of volatile organic emissions. Such a catalyst system produces copolymers in which the comonomer is randomly distributed within a molecular chain and uniformly distributed across the different molecular weight fractions. Examples of metallocene catalysts include bis(n-butylcyclopentadienyl)titanium dichloride, bis(n-butylcyclopentadienyl)zirconium dichloride, bis(cyclopentadienyl)scandium chloride, bis(indenyl)zirconium dichloride, bis(methylcyclopentadienyl)titanium dichloride, bis(methylcyclopentadienyl)zirconium dichloride, cobaltocene, cyclopentadienyltitanium trichloride, ferrocene, hafnocene dichloride, isopropyl(cyclopentadienyl-1-flourenyl)zirconium dichloride, molybdocene dichloride, nickelocene, niobocene dichloride, ruthenocene, titanocene dichloride, zirconocene chloride hydride, zirconocene dichloride, and so forth. Polymers made using metallocene catalysts typically have a narrow molecular weight range. For instance, metallocene-catalyzed polymers may have polydispersity numbers (Mw/Mn) of below 4, controlled short chain branching distribution, and controlled isotacticity.

It should be noted that the polymer matrix may contain a propylene polymer in combination with one or more additional polymers, which may or may not themselves be propylene polymers. In some embodiments, for instance, a blend of propylene polymers may be employed, such as a blend of a propylene homopolymer and a propylene/α-olefin copolymer, blend of multiple propylene homopolymers, or a blend of multiple propylene/α-olefin copolymers. In one particular embodiment, for instance, the polymer matrix contains at least one propylene homopolymer, which is typically metallocene-catalyzed. In such embodiments, the polymer matrix may contain only propylene homopolymers. Alternatively, the polymer matrix may contain a blend of a propylene homopolymer (e.g., metallocene-catalyzed) and a propylene/α-olefin copolymer, which may be metallocene-catalyzed or formed from other types of processes (e.g., Ziegler Natta-catalyzed). In one embodiment, a blend may be employed that contains propylene homopolymers in an amount of from about 30 wt. % to about 70 wt. %, in some embodiments from about 35 wt. % to about 65 wt. %, and in some embodiments, from about 40 wt. % to about 60 wt. % of the matrix, and propylene α-olefin copolymers in an amount of from about 30 wt. % to about 70 wt. %, in some embodiments from about 35 wt. % to about 65 wt. %, and in some embodiments, from about 40 wt. % to about 60 wt. % of the matrix.

The thermoplastic polymers employed in the composition typically have a high degree of flow to help facilitate molding of the composition into small parts. High flow propylene polymers may, for example, have a relatively high melt flow index, such as about 150 grams per 10 minutes or more, in some embodiments about 180 grams per 10 minutes or more, and in some embodiments, from about 200 to about 500 grams per 10 minutes, as determined in accordance with

ISO 1133-1:2011 (technically equivalent to ASTM D1238-13) at a load of 2.16 kg and temperature of 230° C.

B. Stabilizer System

As indicated above, the polymer matrix also contains a stabilizer system to help maintain the desired surface appearance and/or mechanical properties even after being exposed to ultraviolet light and high temperatures. More particularly, the stabilizer system includes at least one antioxidant (e.g., sterically hindered phenol antioxidant, phosphite antioxidant, thioester antioxidant, etc.), an ultraviolet light stabilizer, carbon material, as well as various other optional light stabilizers, optional heat stabilizers, and so forth.

i. Antioxidants

One type of antioxidant that may be employed in the polymer composition is a sterically hindered phenol. When employed, sterically hindered phenols are typically present in an amount of from about 0.01 to about 1 wt. %, in some embodiments from about 0.02 wt. % to about 0.5 wt. %, and in some embodiments, from about 0.05 wt. % to about 0.3 wt. % of the polymer composition. While a variety of different compounds may be employed, particularly suitable hindered phenol compounds are those having one of the following general structures (IV), (V) and (VI):

wherein, d ranges from 1 to 10, and in some embodiments, from 2 to 6;

$R^{16}$, $R^{17}$, $R^{18}$, and $R^{19}$ are independently selected from hydrogen, $C_1$ to $C_{10}$ alkyl, and $C_3$ to $C_{30}$ branched alkyl, such as methyl, ethyl, propyl, isopropyl, butyl, or tertiary butyl moieties.

Specific examples of suitable hindered phenols having a general structure as set forth above may include, for instance, 2,6-di-tert-butyl-4-methylphenol; 2,4-di-tert-butyl-phenol; pentaerythrityl tetrakis(3,5-di-tert-butyl-4-hydroxyphenyl)propionate; octadecyl-3-(3',5'-di-tert-butyl-4'-hydroxyphenyl)propionate; tetrakis[methylene(3,5-di-tert-butyl-4-hydroxycinnamate)]methane, bis-2,2'-methylene-bis(6-tert-butyl-4-methylphenol)terephthalate, 1,3,5-trimethyl-2,4,6-tris(3,5-di-tert-butyl-4-hydroxybenzyl) benzene, tris(3,5-di-tert-butyl-4-hydroxybenzyl) isocyanurate; 1,3,5-tris(4-tert-butyl-3-hydroxy-2,6-dimethylbenzyl)1,3,5-triazine-2,4,6-(1H,3H,5H)-trione; 1,1,3-tris(2-methyl-4-hydroxy-5-tert-butylphenyl)butane, 1,3,5-triazine-2,4,6(1H,3H,5H)-trione; 1,3,5-tris[[3,5-bis-(1,1-dimethylethyl)-4-hydroxyphenyl]methyl]; 4,4',4"-[(2,4,6-trimethyl-1,3,5-benzenetriyl)tris-(methylene)]tris[2,6-bis(1,1-dimethylethyl)]; 6-tert-butyl-3-methylphenyl; 2,6-di-tert-butyl-p-cresol; 2,2'-methylenebis(4-ethyl-6-tert-butylphenol); 4,4'-butylidenebis(6-tert-butyl-m-cresol); 4,4'-thiobis(6-tert-butyl-m-cresol); 4,4'-dihydroxydiphenyl-cyclohexane; alkylated bisphenol; styrenated phenol; 2,6-di-tert-butyl-4-methylphenol; n-octadecyl-3-(3',5'-di-tert-butyl-4'-hydroxyphenyl)propionate, 2,2'-methylenebis(4-methyl-6-tert-butylphenol); 4,4'-thiobis(3-methyl-6-tert-butylphenyl); 4,4'-butylidenebis(3-methyl-6-tert-butylphenol); stearyl-β-(3,5-di-tert-butyl-4-hydroxyphenyl) propionate, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene; tetrakis[methylene-3-(3',5'-di-tert-butyl-4'-hydroxyphenyl)propionate]methane, stearyl 3,5-di-tert-butyl-4-hydroxyhydocinnamate; and so forth, as well as mixtures thereof.

Particularly suitable compounds are those having the general structure (VI), such as tris(3,5-di-tert-butyl-4-hydroxybenzyl)isocyanurate, which is commercially available under the designation Irganox® 3114.

Another suitable antioxidant is a phosphite antioxidant. When employed, phosphite antioxidants are typically present in an amount of from about 0.02 to about 2 wt. %, in some embodiments from about 0.04 wt. % to about 1 wt. %, and in some embodiments, from about 0.1 wt. % to about 0.6 wt. % of the polymer composition. The phosphite antioxidant may include a variety of different compounds, such as aryl monophosphites, aryl disphosphites, etc., as well as mixtures thereof. For example, an aryl diphosphite may be employed that has the following general structure (IX):

wherein, $R_1$, $R_2$, $R_3$, $R_4$, $R_5$, $R_6$, $R_7$, $R_8$, $R_9$, and $R_{10}$ are independently selected from hydrogen, $C_1$ to $C_{10}$ alkyl, and $C_3$ to $C_{30}$ branched alkyl, such as methyl, ethyl, propyl, isopropyl, butyl, or tertiary butyl moieties.

Examples of such aryl diphosphite compounds include, for instance, bis(2,4-dicumylphenyl)pentaerythritol diphosphite (commercially available as Doverphos® S-9228) and bis(2,4-di-t-butylphenyl)pentaerythritol diphosphite (commercially available as Ultranox® 626). Likewise, suitable aryl monophosphites may include tris(2,4-di-tert-butylphenyl)phosphite (commercially available as Irgafos® 168); bis(2,4-di-tert-butyl-6-methylphenyl) ethyl phosphite (commercially available as Irgafos® 38); and so forth.

Yet another suitable antioxidant is a thioester antioxidant. When employed, thioester antioxidants are also typically present in an amount of from about 0.04 to about 4 wt. %, in some embodiments from about 0.08 wt. % to about 2 wt. %, and in some embodiments, from about 0.2 wt. % to about 1.2 wt. % of the polymer composition. Particularly suitable thioester antioxidants for use in the present invention are thiocarboxylic acid esters, such as those having the following general structure:

$$R_{11}-(O)(CH_2)_x-S-(CH_2)_y(O)O-R_{12}$$

wherein, x and y are independently from 1 to 10, in some embodiments 1 to 6, and in some embodiments, 2 to 4 (e.g., 2);

$R_{11}$ and $R_{12}$ are independently selected from linear or branched, $C_6$ to $C_{30}$ alkyl, in some embodiments $C_{10}$ to $C_{24}$ alkyl, and in some embodiments, $C_{12}$ to $C_{20}$ alkyl, such as lauryl, stearyl, octyl, hexyl, decyl, dodecyl, oleyl, etc.

Specific examples of suitable thiocarboxylic acid esters may include for instance, distearyl thiodipropionate (commercially available as Irganox® PS 800), dilauryl thiodipropionate (commercially available as Irganox® PS 802), di-2-ethylhexyl-thiodipropionate, diisodecyl thiodipropionate, etc.

In particularly suitable embodiments of the present invention, a combination of antioxidants may be employed to help provide a synergistic effect on the properties of the composition. In one embodiment, for instance, the stabilizer system may employ a combination of at least one sterically hindered antioxidant, phosphite antioxidant, and thioester antioxidant. When employed, the weight ratio of the phosphite antioxidant to the hindered phenol antioxidant may range from about 1:1 to about 5:1, in some embodiments from about 1:1 to about 4:1, and in some embodiments, from about 1.5:1 to about 3:1 (e.g., about 2:1). The weight ratio of the thioester stabilizer to the phosphite antioxidant is also generally from about 1:1 to about 5:1, in some embodiments from about 1:1 to about 4:1, and in some embodiments, from about 1.5:1 to about 3:1 (e.g., about 2:1). Likewise, the weight ratio of the thioester antioxidant to the hindered phenol antioxidant is also generally from about 2:1 to about 10:1, in some embodiments from about 2:1 to about 8:1, and in some embodiments, from about 3:1 to about 6:1 (e.g., about 4:1). Within these selected ratios, it is believed that the composition is capable of achieving a unique ability to remain stable even after exposure to high temperatures and/or ultraviolet light.

ii. UV Stabilizers

The polymer composition also contains one or more UV stabilizers. Suitable UV stabilizers may include, for instance, benzophenones (e.g., (2-hydroxy-4-(octyloxy)phenyl)phenyl,methanone (Chimassorb® 81), benzotriazoles (e.g., 2-(2-hydroxy-3,5-di-α-cumylphenyl)-2H-benzotriazole (Tinuvin® 234), 2-(2-hydroxy-5-tert-octylphenyl)-2H-benzotriazole (Tinuvin® 329), 2-(2-hydroxy-3-α-cumyl-5-tert-octylphenyl)-2H-benzotriazole (Tinuvin® 928), etc.), triazines (e.g., 2,4-diphenyl-6-(2-hydroxy-4-hexyloxyphenyl)-s-triazine (Tinuvin® 1577)), sterically hindered amines (e.g., bis(2,2,6,6-tetramethyl-4-piperidyl)sebacate (Tinuvin® 770) or a polymer of dimethyl succinate and 1-(2-hydroxyethyl)-4-hydroxy-2,2,6,6-tetramethyl-4-piperidine (Tinuvin®622)), and so forth, as well as mixtures thereof. Benzophenones are particularly suitable for use in the polymer composition. When employed, such UV stabilizers typically constitute from about 0.05 wt. % to about 2 wt. % in some embodiments from about 0.1 wt. % to about 1.5 wt. %, and in some embodiments, from about 0.2 wt. % to about 1.0 wt. % of the composition.

iii. Carbon Material

The stabilizer system also contains a carbon material to help impart the desired degree of color stability after exposure to ultraviolet light and/or high temperatures. The carbon material generally includes a plurality of carbon particles, such as carbon black, carbon nanotubes, and so forth. Carbon black may be particularly suitable, such as furnace black, channel black, acetylene black, or lamp black. The carbon particles may have any desired shape, such as a granular, flake (scaly), etc. The average size (e.g., diameter) of the carbon particles may be relatively small, such as from about 1 to about 200 nanometers, in some embodiments from about 5 to about 150 nanometers, and in some embodiments, from about 10 to about 100 nanometers. It is also typically desired that the carbon particles are relatively pure, such as containing polynuclear aromatic hydrocarbons (e.g., benzo[a]pyrene, naphthalene, etc.) in an amount of about 1 part per million ("ppm") or less, and in some embodiments, about 0.5 ppm or less. For example, the carbon particles may contain benzo[a]pyrene in an amount of about 10 parts per billion ("ppb") or less, and in some embodiments, about 5 ppb or less. If desired, the particles may also have a high specific surface area, such as from about 20 square meters per gram ($m^2/g$) to about 1,000 $m^2/g$, in some embodiments from about 25 $m^2/g$ to about 500 $m^2/g$, and in some embodiments, from about 30 $m^2/g$ to about 300 $m^2/g$. Surface area may be determined by the physical gas adsorption (BET) method (nitrogen as the adsorption gas) in accordance with ASTM D6556-19a. Without intending to be limited by theory, it is believed that particles having such a small size, high purity, and/or high surface area may improve the adsorption capability for many free radicals, which can minimize oxidation of the thermoplastic polymer.

If desired, the carbon material may include a carrier resin that can encapsulate the carbon particles, thereby providing a variety of benefits. For example, the carrier resin can enhance the ability of the particles to be handled and incorporated into the polymer matrix. While any known carrier resin may be employed for this purpose, in particular embodiments, the carrier resin may be an olefin polymer such as described above (e.g., propylene polymer), which may be the same or different than an olefin polymer employed in the polymer matrix. If desired, the carrier resin may be pre-blended with the carbon particles to form a masterbatch, which can later be combined with the polymer matrix. When employed, the carrier resin typically constitutes from about 40 wt. % to about 90 wt. %, in some embodiments from about 50 wt. % to about 80 wt. %, and in some embodiments, from about 60 wt. % to about 70 wt. % of the masterbatch, and the carbon particles typically constitute from about 10 wt. % to about 60 wt. %, in some embodiments from about 20 wt. % to about 50 wt. %, and in some embodiments, from about 30 wt. % to about 40 wt. % of the masterbatch. The relative concentration of the carbon particles and the carrier resin may be selectively controlled in the present invention to achieve the desired antioxidant behavior without adversely impacting the mechanical properties of the polymer composition. For example, the carbon particles are typically employed in an amount of from about from about 0.2 to about 2 wt. %, in some embodiments from about 0.25 to about 1.5 wt. %, and in some embodiments, from about 0.3 to about 1 wt. % of the entire polymer composition. The carbon material, which may contain a carrier resin, may likewise constitute from about 0.4 wt. % to about 4 wt. %, in some embodiments from about 0.5 wt. % to about 3 wt. %, and in some embodiments, from about 0.6 wt. % to about 2 wt. % of the polymer composition.

C. Other Components

In addition to the components noted above, the polymer matrix may also contain a variety of other components. Examples of such optional components may include, for instance, compatibilizers, particulate fillers, lubricants, colorants, flow modifiers, pigments, and other materials added to enhance properties and processability. Suitable pigments may include, for instance, titanium dioxide, ultramarine blue, cobalt blue, phthalocyanines, anthraquinones, black pigments, metallic pigments, etc. When employing a black pigment, the carbon material noted above may also function as the pigment and/or or an additional black pigment may be employed. A compatibilizer may also be employed to enhance the degree of adhesion between the long fibers with the polymer matrix. When employed, such compatibilizers typically constitute from about 0.1 wt. % to about 15 wt. %, in some embodiments from about 0.5 wt. % to about 10 wt. %, and in some embodiments, from about 1 wt. % to about 5 wt. % of the polymer composition. In certain embodiments, the compatibilizer may be a polyolefin compatibilizer that contains a polyolefin that is modified with a polar functional group. The polyolefin may be an olefin homopolymer (e.g., polypropylene) or copolymer (e.g., ethylene copolymer, propylene copolymer, etc.). The functional group may be grafted onto the polyolefin backbone or incorporated as a monomeric constituent of the polymer (e.g., block or random copolymers), etc. Particularly suitable functional groups include maleic anhydride, maleic acid, fumaric acid, maleimide, maleic acid hydrazide, a reaction product of maleic anhydride and diamine, dichloromaleic anhydride, maleic acid amide, etc.

Regardless of the particular components employed, the raw materials (e.g., thermoplastic polymers, stabilizers, compatibilizers, etc.) are typically melt blended together to form the polymer matrix prior to being reinforced with the long fibers. The raw materials may be supplied either simultaneously or in sequence to a melt-blending device that dispersively blends the materials. Batch and/or continuous melt blending techniques may be employed. For example, a mixer/kneader, Banbury mixer, Farrel continuous mixer, single-screw extruder, twin-screw extruder, roll mill, etc., may be utilized to blend the materials. One particularly suitable melt-blending device is a co-rotating, twin-screw extruder (e.g., ZSK-30 twin-screw extruder available from Werner & Pfleiderer Corporation of Ramsey, N.J.). Such extruders may include feeding and venting ports and provide high intensity distributive and dispersive mixing. For example, the propylene polymer may be fed to a feeding port of the twin-screw extruder and melted. Thereafter, the stabilizers may be injected into the polymer melt. Alternatively, the stabilizers may be separately fed into the extruder at a different point along its length. Regardless of the particular melt blending technique chosen, the raw materials are blended under high shear/pressure and heat to ensure sufficient mixing. For example, melt blending may occur at a temperature of from about 150° C. to about 300° C., in some embodiments, from about 155° C. to about 250° C., and in some embodiments, from about 160° C. to about 220° C.

As noted above, certain embodiments of the present invention contemplate the use of a blend of polymers within the polymer matrix (e.g., propylene homopolymers and/or propylene/α-olefin copolymers). In such embodiments, each of the polymers employed in the blend may be melt blended in the manner described above. In yet other embodiments, however, it may be desired to melt blend a first polymer (e.g., propylene polymer) to form a concentrate, which is then reinforced with long fibers in the manner described below to form a precursor composition. The precursor composition may thereafter be blended (e.g., dry blended) with a second polymer (e.g., propylene polymer) to form a polymer composition with the desired properties. It should also be understood that additional polymers can also be added during prior to and/or during reinforcement of the polymer matrix with the long fibers.

II. Long Fibers

To form the fiber-reinforced composition of the present invention, long fibers are generally embedded within the polymer matrix. The term "long fibers" generally refers to fibers, filaments, yarns, or rovings (e.g., bundles of fibers) that are not continuous and have a length of from about 1 to about 25 millimeters, in some embodiments, from about 1.5 to about 20 millimeters, in some embodiments from about 2 to about 15 millimeters, and in some embodiments, from about 3 to about 12 millimeters. A substantial portion of the fibers may maintain a relatively large length even after being formed into a shaped part (e.g., injection molding). That is, the median length (D50) of the fibers in the composition may be about 1 millimeter or more, in some embodiments about 1.5 millimeters or more, in some embodiments about 2.0 millimeters or more, and in some embodiments, from about 2.5 to about 8 millimeters. Regardless of their length, the nominal diameter of the fibers (e.g., diameter of fibers within a roving) may be selectively controlled to help improve the surface appearance of the resulting polymer composition. More particularly, the nominal diameter of the fibers may range from about 20 to about 40 micrometers, in some embodiments from about 20 to about 30 micrometers, and in some embodiments, from about 21 to about 26 micrometers. Within this range, the tendency of the fibers to become "clumped" on the surface of a shaped part is reduced, which allows the color and the surface appearance of the part to predominantly stem from the polymer matrix. In addition to providing improved aesthetic consistency, it also allows the color to be better maintained after exposure to ultraviolet light as a stabilizer system can be more readily employed within the polymer matrix. Of course, it should be understood that other nominal diameters may be employed, such as those from about 1 to about 20 micrometers, in some embodiments from about 8 to about 19 micrometers, and in some embodiments, from about 10 to about 18 micrometers.

The fibers may be formed from any conventional material known in the art, such as metal fibers; glass fibers (e.g., E-glass, A-glass, C-glass, D-glass, AR-glass, R-glass, S1-glass, S2-glass), carbon fibers (e.g., graphite), boron fibers, ceramic fibers (e.g., alumina or silica), aramid fibers (e.g., Kevlar®), synthetic organic fibers (e.g., polyamide, polyethylene, paraphenylene, terephthalamide, polyethylene terephthalate and polyphenylene sulfide), and various other natural or synthetic inorganic or organic fibrous materials known for reinforcing thermoplastic compositions. Glass fibers and carbon fibers are particularly desirable. The fibers may be twisted or straight. If desired, the fibers may be in the form of rovings (e.g., bundle of fibers) that contain a single fiber type or different types of fibers. Different fibers may be contained in individual rovings or, alternatively, each roving may contain a different fiber type. For example, in one embodiment, certain rovings may contain carbon fibers, while other rovings may contain glass fibers. The number of fibers contained in each roving can be constant or vary from roving to roving. Typically, a roving may contain from about 1,000 fibers to about 50,000 individual fibers, and in some embodiments, from about 2,000 to about 40,000 fibers.

Figure 1:
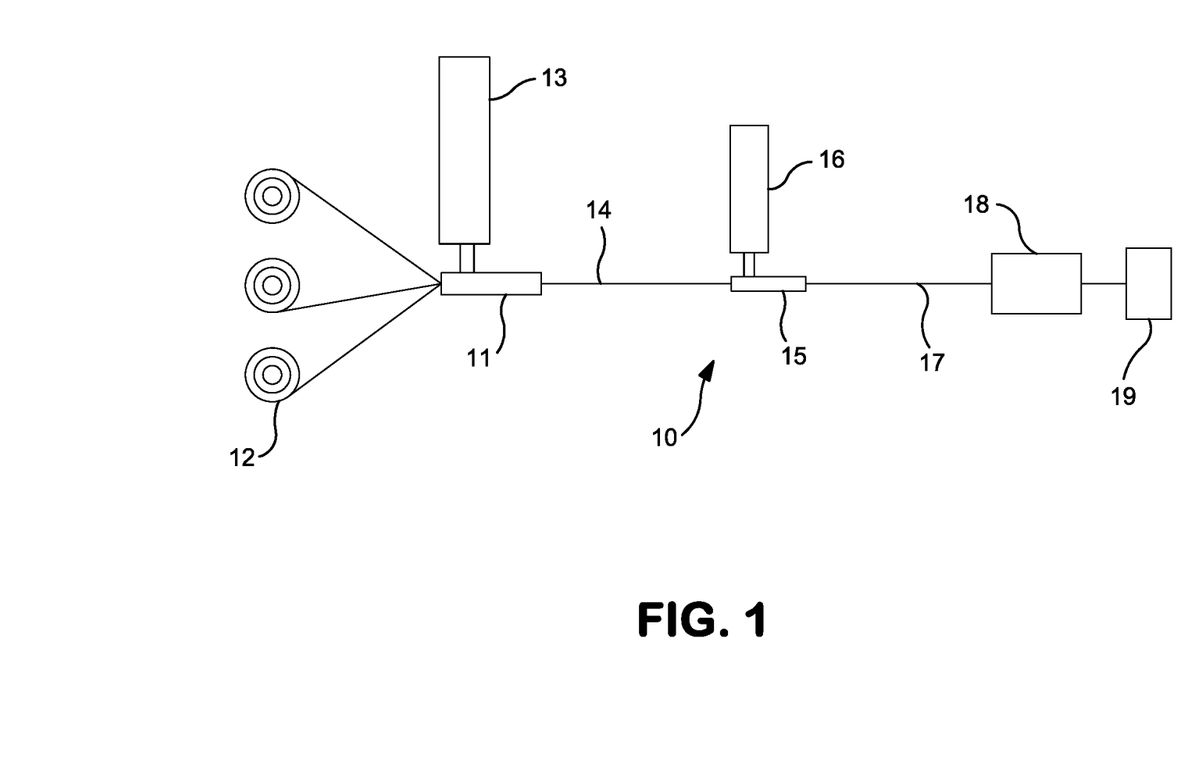
FIG. 1 is a schematic illustration of one embodiment of a system that may be used to form the fiber-reinforced polymer composition of the present invention.

Any of a variety of different techniques may generally be employed to incorporate the fibers into the polymer matrix. The long fibers may be randomly distributed within the polymer matrix, or alternatively distributed in an aligned fashion. In one embodiment, for instance, continuous fibers may initially be impregnated into the polymer matrix to form strands, which are thereafter cooled and then chopped into pellets to that the resulting fibers have the desired length for the long fibers. In such embodiments, the polymer matrix and continuous fibers (e.g., rovings) are typically pultruded through an impregnation die to achieve the desired contact between the fibers and the polymer. Pultrusion can also help ensure that the fibers are spaced apart and aligned in the same or a substantially similar direction, such as a longitudinal direction that is parallel to a major axis of the pellet (e.g., length), which further enhances the mechanical properties. Referring to FIG. 1, for instance, one embodiment of a pultrusion process 10 is shown in which a polymer matrix is supplied from an extruder 13 to an impregnation die 11 while continuous fibers 12 are a pulled through the die 11 via a puller device 18 to produce a composite structure 14. Typical puller devices may include, for example, caterpillar pullers and reciprocating pullers. While optional, the composite structure 14 may also be pulled through a coating die 15 that is attached to an extruder 16 through which a coating resin is applied to form a coated structure 17. As shown in FIG. 1, the coated structure 17 is then pulled through the puller assembly 18 and supplied to a pelletizer 19 that cuts the structure 17 into the desired size for forming the long fiber-reinforced composition.

Figure 2:
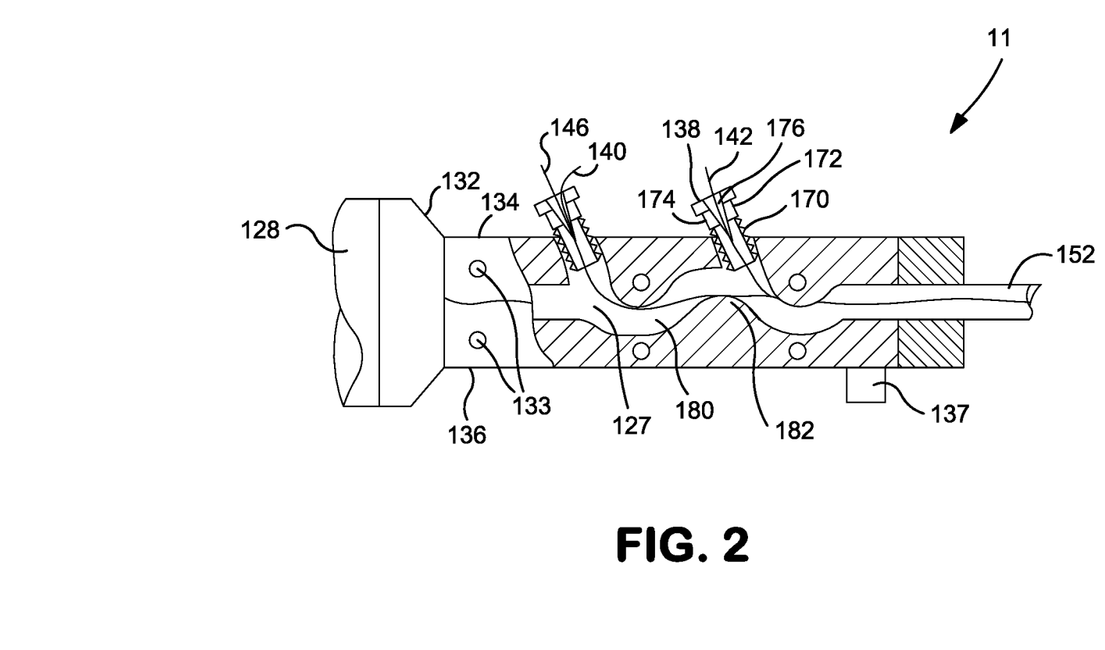
FIG. 2 is a cross-sectional view of an impregnation die that may be employed in the system shown in FIG. 1.

The nature of the impregnation die employed during the pultrusion process may be selectively varied to help achieved good contact between the polymer matrix and the long fibers. Examples of suitable impregnation die systems are described in detail in U.S. Reissue Pat. No. 32,772 to Hawley; U.S. Pat. No. 9,233,486 to Regan, et al.; and U.S. Pat. No. 9,278,472 to Easter), et al. Referring to FIG. 2, for instance, one embodiment of such a suitable impregnation die 11 is shown. As shown, a polymer matrix 127 may be supplied to the impregnation die 11 via an extruder (not shown). More particularly, the polymer matrix 127 may exit the extruder through a barrel flange 128 and enter a die flange 132 of the die 11. The die 11 contains an upper die half 134 that mates with a lower die half 136. Continuous fibers 142 (e.g., roving) are supplied from a reel 144 through feed port 138 to the upper die half 134 of the die 11. Similarly, continuous fibers 146 are also supplied from a reel 148 through a feed port 140. The matrix 127 is heated inside die halves 134 and 136 by heaters 133 mounted in the upper die half 134 and/or lower die half 136. The die is generally operated at temperatures that are sufficient to cause melting and impregnation of the thermoplastic polymer. Typically, the operation temperatures of the die is higher than the melt temperature of the polymer matrix. When processed in this manner, the continuous fibers 142 and 146 become embedded in the matrix 127. The mixture is then pulled through the impregnation die 11 to create a fiber-reinforced composition 152. If desired, a pressure sensor 137 may also sense the pressure near the impregnation die 11 to allow control to be exerted over the rate of extrusion by controlling the rotational speed of the screw shaft, or the federate of the feeder.

Within the impregnation die, it is generally desired that the fibers contact a series of impingement zones. At these zones, the polymer melt may flow transversely through the fibers to create shear and pressure, which significantly enhances the degree of impregnation. This is particularly useful when forming a composite from ribbons of a high fiber content. Typically, the die will contain at least 2, in some embodiments at least 3, and in some embodiments, from 4 to 50 impingement zones per roving to create a sufficient degree of shear and pressure. Although their particular form may vary, the impingement zones typically possess a curved surface, such as a curved lobe, rod, etc. The impingement zones are also typically made of a metal material.

FIG. 2 shows an enlarged schematic view of a portion of the impregnation die 11 containing multiple impingement zones in the form of lobes 182. It should be understood that this invention can be practiced using a plurality of feed ports, which may optionally be coaxial with the machine direction. The number of feed ports used may vary with the number of fibers to be treated in the die at one time and the feed ports may be mounted in the upper die half 134 or the lower die half 136. The feed port 138 includes a sleeve 170 mounted in upper die half 134. The feed port 138 is slidably mounted in a sleeve 170. The feed port 138 is split into at least two pieces, shown as pieces 172 and 174. The feed port 138 has a bore 176 passing longitudinally therethrough. The bore 176 may be shaped as a right cylindrical cone opening away from the upper die half 134. The fibers 142 pass through the bore 176 and enter a passage 180 between the upper die half 134 and lower die half 136. A series of lobes 182 are also formed in the upper die half 134 and lower die half 136 such that the passage 210 takes a convoluted route. The lobes 182 cause the fibers 142 and 146 to pass over at least one lobe so that the polymer matrix inside the passage 180 thoroughly contacts each of the fibers. In this manner, thorough contact between the molten polymer and the fibers 142 and 146 is assured.

To further facilitate impregnation, the fibers may also be kept under tension while present within the impregnation die. The tension may, for example, range from about 5 to about 300 Newtons, in some embodiments from about 50 to about 250 Newtons, and in some embodiments, from about 100 to about 200 Newtons per tow of fibers. Furthermore, the fibers may also pass impingement zones in a tortuous path to enhance shear. For example, in the embodiment shown in FIG. 2, the fibers traverse over the impingement zones in a sinusoidal-type pathway. The angle at which the rovings traverse from one impingement zone to another is generally high enough to enhance shear, but not so high to cause excessive forces that will break the fibers. Thus, for example, the angle may range from about 1° to about 30°, and in some embodiments, from about 5° to about 25°.

The impregnation die shown and described above is but one of various possible configurations that may be employed in the present invention. In alternative embodiments, for example, the fibers may be introduced into a crosshead die that is positioned at an angle relative to the direction of flow of the polymer melt. As the fibers move through the crosshead die and reach the point where the polymer exits from an extruder barrel, the polymer is forced into contact with the fibers. It should also be understood that any other extruder design may also be employed, such as a twin screw extruder. Still further, other components may also be optionally employed to assist in the impregnation of the fibers. For example, a "gas jet" assembly may be employed in certain embodiments to help uniformly spread a bundle or tow of individual fibers, which may each contain up to as many as 24,000 fibers, across the entire width of the merged tow. This helps achieve uniform distribution of strength properties in the ribbon. Such an assembly may include a supply of compressed air or another gas that impinges in a generally perpendicular fashion on the moving fiber tows that pass across the exit ports. The spread fiber bundles may then be introduced into a die for impregnation, such as described above.

The fiber-reinforced polymer composition may generally be employed to form a shaped part using a variety of different techniques. Suitable techniques may include, for instance, injection molding, low-pressure injection molding, extrusion compression molding, gas injection molding, foam injection molding, low-pressure gas injection molding, low-pressure foam injection molding, gas extrusion compression molding, foam extrusion compression molding, extrusion molding, foam extrusion molding, compression molding, foam compression molding, gas compression molding, etc. For example, an injection molding system may be employed that includes a mold within which the fiber-reinforced composition may be injected. The time inside the injector may be controlled and optimized so that polymer matrix is not pre-solidified. When the cycle time is reached and the barrel is full for discharge, a piston may be used to inject the composition to the mold cavity. Compression molding systems may also be employed. As with injection molding, the shaping of the fiber-reinforced composition into the desired article also occurs within a mold. The composition may be placed into the compression mold using any known technique, such as by being picked up by an automated robot arm. The temperature of the mold may be maintained at or above the solidification temperature of the polymer matrix for a desired time period to allow for solidification. The molded product may then be solidified by bringing it to a temperature below that of the melting temperature. The resulting product may be de-molded. The cycle time for each molding process may be adjusted to suit the polymer matrix, to achieve sufficient bonding, and to enhance overall process productivity. Due to the unique properties of the fiber-reinforced composition, relatively thin shaped parts (e.g., injection molded parts) can be readily formed therefrom. For example, such parts may have a thickness of about 4 millimeters or less, in some embodiments about 2.5 millimeters or less, in some embodiments about 2 millimeters or less, in some embodiments about 1.8 millimeters or less, and in some embodiments, from about 0.4 to about 1.6 millimeters (e.g., 1.2 millimeters).

The present invention may be better understood with reference to the following examples.

Test Methods

Melt Flow Index: The melt flow index of a polymer or polymer composition may be determined in accordance with ISO 1133-1:2011 (technically equivalent to ASTM D1238-13) at a load of 2.16 kg and temperature of 230° C.

Volatile Organic Content ("VOC"): The total volatile organic content may be determined in accordance with an automotive industry standard test known as VDA 277:1995. In this test, for instance, a gas chromatography (GC) device may be employed with a WCOT-capillary column (wax type) of 0.25 mm inner diameter and 30 m length. The GC settings may be as follows: 3 minutes isothermal at 50° C., heat up to 200° C. at 12 K/min, 4 minutes isothermal at 200° C., injection-temperature of 200° C., detection-temperature of 250° C., carrier is helium, flow-mode split of 1:20 and average carrier-speed of 22-27 cm/s. A flame ionization detector ("FID") may be employed to determine the total volatile content and a mass spectrometry ("MS") detector may also be optionally employed to determine single volatile components. After testing, the VOC amount is calculated by dividing the amount of volatiles (micrograms of carbon equivalents) by the weight (grams) of the composition.

Toluene Volatile Organic Content ("TVOC"): The toluene-equivalent volatile organic content may be determined in accordance with an automotive industry standard test known as VDA 278:2002. More particularly, measurements may be made on a sample using a thermaldesoprtion analyzer ("TDSA"), such as supplied by Gerstel using helium 5.0 as carrier gas and a column HP Ultra 2 of 50 m length and 0.32 mm diameter and 0.52 μm coating of 5% phenylmethylsiloxane. The analysis may, for example, be performed using device setting 1 and the following parameters: flow mode of splitless, final temperature of 90° C., final time of 30 min, and rate of 60 K/min. The cooling trap may be purged with a flow-mode split of 1:30 in a temperature range from −150° C. to +280° C. with a heating rate of 12 K/sec and a final time of 5 min. For analysis, the gas chromatography ("GC") settings may be 2 min isothermal at 40° C., heating at 3 K/min up to 92° C., then at 5 K/min up to 160° C., and then at 10 K/min up to 280° C., 10 minutes isothermal, and flow of 1.3 ml/min. After testing, the TVOC amount is calculated by dividing the amount of volatiles (micrograms of toluene equivalents) by the weight (grams) of the composition.

Fogging Content ("FOG"): The fogging content may be determined in accordance with an automotive industry standard test known as VDA 278:2002. More particularly, measurements may be made on a sample using a thermaldesoprtion analyzer ("TDSA"), such as supplied by Gerstel using helium 5.0 as carrier gas and a column HP Ultra 2 of 50 m length and 0.32 mm diameter and 0.52 μm coating of 5% phenylmethylsiloxane. The analysis may, for example, be performed using device setting 1 and the following parameters: flow mode of splitless, final temperature of 120° C.; final time of 60 min, and rate of 60 K/min. The cooling trap may be purged with a flow-mode split of 1:30 in a temperature range from −150° C. to +280° C. with a heating rate of 12 K/sec. For analysis, the gas chromatography ("GC") settings may be 2 min isothermal at 50° C., heating at 25 K/min up to 160° C., then at 10 K/min up to 280° C., 30 minutes isothermal, and flow of 1.3 ml/min. After testing, the FOG amount is calculated by dividing the amount of volatiles (micrograms of hexadecane equivalents) by the weight (grams) of the composition.

Tensile Modulus, Tensile Stress, and Tensile Elongation at Break: Tensile properties may be tested according to ISO Test No. 527-1:2019 (technically equivalent to ASTM D638-14). Modulus and strength measurements may be made on a dogbone-shaped test strip sample having a length of 170/190 mm, thickness of 4 mm, and width of 10 mm. The testing temperature may be −30° C., 23° C., or 80° C. and the testing speeds may be 1 or 5 mm/min.

Flexural Modulus, Flexural Elongation at Break, and Flexural Stress: Flexural properties may be tested according to ISO Test No. 178:2019 (technically equivalent to ASTM D790-17). This test may be performed on a 64 mm support span. Tests may be run on the center portions of uncut ISO 3167 multi-purpose bars. The testing temperature may be −30° C., 23° C., or 80° C. and the testing speed may be 2 mm/min.

Notched Charpy Impact Strength: Charpy properties may be tested according to ISO Test No. ISO 179-1:2010) (technically equivalent to ASTM D256-10, Method B). This test may be run using a Type 1 specimen size (length of 80 mm, width of 10 mm, and thickness of 4 mm). When testing the notched impact strength, the notch may be a Type A notch (0.25 mm base radius). Specimens may be cut from the center of a multi-purpose bar using a single tooth milling machine. The testing temperature may be −30° C., 23° C., or 80° C.

Deflection Temperature Under Load ("DTUL"): The deflection under load temperature may be determined in accordance with ISO Test No. 75-2:2013 (technically equivalent to ASTM D648-07). More particularly, a test strip sample having a length of 80 mm, width of 10 mm, and thickness of 4 mm may be subjected to an edgewise three-point bending test in which the specified load (maximum outer fibers stress) was 1.8 Megapascals. The specimen may be lowered into a silicone oil bath where the temperature is raised at 2° C. per minute until it deflects 0.25 mm (0.32 mm for ISO Test No. 75-2:2013).

Example 1

A sample is formed that contains approximately 54.9 wt. % of a propylene homopolymer (melt flow index of 65 g/10 min, density of 0.902 g/cm$^3$), 1.2 wt. % of a coupling agent, 3.9 wt. % of a stabilizer system, and 40 wt. % continuous glass fiber rovings (2400 Tex, filament diameter of 16 μm). The stabilizer system contained 9.0 wt. % Irganox® B 225, 30.6 wt. % Chimassorb® 944, 15.8 wt. % Irganox® 1010, 3.6 wt. % Irgafos® 168, 7.2 wt. % Chimassorb® 234, 15.8 wt. % Ultranox® 626, and 18 wt. % calcium carbonate. The sample is melt processed in a single screw extruder (90 mm) in which the melt temperature is 265° C., the die temperature is 330° C., and the zone temperatures range from 160° C. to 320° C., and the screw speed is 160 rpm.

Example 2

A sample is formed that contains approximately 56.9 wt. % of a propylene homopolymer (melt flow index of 65 g/10 min, density of 0.902 g/cm$^3$), 1.2 wt. % of a coupling agent, 1.9 wt. % of a stabilizer system, and 40 wt. % continuous glass fiber rovings (2400 Tex, filament diameter of 16 μm). The stabilizer system contained 9.2 wt. % Irganox® 3114, 25.8 wt. % Chimassorb® 81, 18.4 wt. % Ultranox® 626, 36.7 wt. % Irganox® PS 102, 0.9 wt. % of a carbon material, and 9 wt. % calcium carbonate. The carbon material was Remafin® Black PP and contained 35 wt. % carbon black particles and 65 wt. % polypropylene. The sample is melt processed in a single screw extruder (90 mm) in which the melt temperature is 265° C., the die temperature is 330° C., and the zone temperatures range from 160° C. to 320° C., and the screw speed is 160 rpm.

Example 3

A sample is formed that contains approximately 56.8 wt. % of a propylene homopolymer (melt flow index of 65 g/10 min, density of 0.902 g/cm$^3$), 1.2 wt. % of a coupling agent, 2 wt. % of a stabilizer system, and 40 wt. % continuous glass fiber rovings (2400 Tex, filament diameter of 16 μm). The stabilizer system contained 9.2 wt. % Irganox® 3114, 25.7 wt. % Chimassorb® 81, 18.4 wt. % Ultranox® 626, 36.6 wt. % Irganox® PS 102, 1.1 wt. % of a carbon material, and 9.0 wt. % calcium carbonate. The carbon material was PXC 14759 PP Black and contained 30 wt. % carbon black particles and 70 wt. % polypropylene. The sample is melt processed in a single screw extruder (90 mm) in which the melt temperature is 265° C., the die temperature is 330° C., and the zone temperatures range from 160° C. to 320° C., and the screw speed is 160 rpm.

Example 4

A sample is formed that contains approximately 57.0 wt. % of a propylene homopolymer (melt flow index of 65 g/10 min, density of 0.902 g/cm$^3$), 1.2 wt. % of a coupling agent, 1.9 wt. % of a stabilizer system, and 40 wt. % continuous glass fiber rovings (2400 Tex, filament diameter of 16 μm). The stabilizer system contained 9.2 wt. % Irganox® 3114, 25.8 wt. % Chimassorb® 81, 18.4 wt. % Ultranox® 626, 36.8 wt. % Irganox® PS 102, 0.8 wt. % of a carbon material, and 9.0 wt. % calcium carbonate. The carbon material was PXC 0109245 PP Black and contained 40 wt. % carbon black particles and 60 wt. % polypropylene. The sample is melt processed in a single screw extruder (90 mm) in which the melt temperature is 265° C., the die temperature is 330° C., and the zone temperatures range from 160° C. to 320° C., and the screw speed is 160 rpm.

Example 5

A sample is formed that contains approximately 56.4 wt. % of a propylene homopolymer (melt flow index of 65 g/10 min, density of 0.902 g/cm$^3$), 1.2 wt. % of a coupling agent, 2.4 wt. % of a stabilizer system, and 40 wt. % continuous glass fiber rovings (2400 Tex, filament diameter of 16 μm). The stabilizer system contained 9.1 wt. % Irganox® 3114, 25.5 wt. % Chimassorb® 81, 18.2 wt. % Ultranox® 626, 36.4 wt. % Irganox® PS 102, 1.9 wt. % of a carbon material, and 8.9 wt. % calcium carbonate. The carbon material was Remafin® Black PP. The sample is melt processed in a single screw extruder (90 mm) in which the melt temperature is 265° C., the die temperature is 330° C., and the zone temperatures range from 160° C. to 320° C., and the screw speed is 160 rpm.

Example 6

A sample is formed that contains approximately 56.1 wt. % of a propylene homopolymer (melt flow index of 65 g/10 min, density of 0.902 g/cm³), 1.2 wt. % of a coupling agent, 2.8 wt. % of a stabilizer system, and 40 wt. % continuous glass fiber rovings (2400 Tex, filament diameter of 16 μm). The stabilizer system contained 9.0 wt. % Irganox® 3114, 25.4 wt. % Chimassorb® 81, 18.1 wt. % Ultranox® 626, 36.2 wt. % Irganox® PS 102, 2.4 wt. % of a carbon material, and 8.9 wt. % calcium carbonate. The carbon material was PXC 0109245 PP Black. The sample is melt processed in a single screw extruder (90 mm) in which the melt temperature is 265° C., the die temperature is 330° C., and the zone temperatures range from 160° C. to 320° C., and the screw speed is 160 rpm.

Samples of Examples 1-6 are tested for mechanical properties and color stability, both before and after long term heat aging at 150° C. for 1,000 hours and after exposure to 2,500 kJ/m² of ultraviolet light. The average results are set forth in the table below.

|  | Units | Example 1 | Example 2 | Example 3 | Example 4 | Example 5 | Example 6 |
|---|---|---|---|---|---|---|---|
| Initial Tensile Strength at 23° C. | MPa | 128.6 | 136.6 | 135.0 | 134.8 | 131.0 | 132.4 |
| Tensile Strength after 1,000 hrs at 150° C. | MPa | 91.2 | 124.4 | 125.2 | 124.4 | 119.6 | 118.4 |
| Tensile Modulus at 23° C. | MPa | 9,477 | 9,119 | 9,592 | 9,549 | 9,107 | 9,210 |
| Tensile Modulus after 1,000 hrs at 150° C. | MPa | 10,431 | 10,200 | 9,619 | 9,916 | 9,688 | 9,858 |
| Tensile Strain at 23° C. | % | 1.9 | 2.1 | 2.0 | 2.0 | 2.1 | 2.1 |
| Tensile Strain after 1,000 hrs at 150° C. | % | 1.1 | 1.6 | 1.6 | 1.6 | 1.6 | 1.6 |
| Flexural Strength at 23° C. | MPa | 209.8 | 220.4 | 216.6 | 221.4 | 217.2 | 217.2 |
| Flexural Modulus at 23° C. | MPa | 9,368 | 8,720 | 8,741 | 8,618 | 8,633 | 8,613 |
| Flexural Strain 23° C. | % | 2.6 | 3.0 | 3.0 | 3.1 | 3.0 | 3.1 |
| Charpy Notched Impact Strength at 23° C. | kJ/m² | 29.9 | 34.3 | 32.1 | 35.0 | 34.6 | 33.9 |
| Delta L* after 2,500 kJ/m² (unwashed) | — | +0.13 | −0.18 | +1.24 | +1.90 | −0.02 | +0.95 |
| Delta a* after 2,500 kJ/m² (unwashed) | — | +0.07 | +0.19 | +0.03 | +0.05 | +0.08 | +0.05 |
| Delta b* after 2,500 kJ/m² (unwashed) | — | +0.36 | +0.77 | +0.41 | +0.18 | +0.41 | +0.15 |
| Delta E after 2,500 kJ/m² (unwashed) | — | 0.59 | 1.23 | 1.40 | 1.92 | 0.65 | 0.98 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A fiber-reinforced polymer composition comprising:
    a polymer matrix that contains a thermoplastic polymer, wherein the polymer matrix constitutes from about 30 wt. % to about 90 wt. % of the composition;
    a stabilizer system comprising an antioxidant, an ultraviolet light stabilizer, and a carbon material that includes carbon particles; and
    a plurality of long reinforcing fibers that are distributed within the polymer matrix, wherein the fibers constitute from about 10 wt. % to about 70 wt. % of the composition;
    wherein the polymer composition defines a surface that exhibits a ΔE value of from about 0.6 to about 3 after being exposed to UV light at a total exposure level of 2,500 kJ/m² according to SAE J2527_2017092, the ΔE value being determined according to the following equation:

$$\Delta E=[(\Delta L^*)^2+(\Delta a^*)^2+(\Delta b^*)^2]^{1/2}$$

wherein, ΔL* is the luminosity value L* of the surface following UV exposure subtracted from the luminosity value L* of the surface prior to UV exposure, Δa* is the red/green axis value a* of the surface following UV exposure subtracted from the red/green axis value a* of the surface prior to UV exposure; and Δb* is the yellow/blue axis value b* of the surface following UV exposure subtracted from the yellow/blue axis value b* of the surface prior to UV exposure, wherein L*, a*, and b* are calculated using CIELAB units according to ASTM D2244-16.

2. The fiber-reinforced polymer composition of claim 1, wherein the antioxidant includes a sterically hindered phenol antioxidant.

3. The fiber-reinforced polymer composition of claim 2, wherein the sterically hindered phenol antioxidant has one of the following general structures (IV), (V) and (VI):

(IV)

(V)

and (VI)

wherein,
a, b and c independently range from 1 to 10;
$R^8$, $R^9$, $R^{10}$, $R^{11}$, and $R^{12}$ are independently selected from hydrogen, $C_1$ to $C_{10}$ alkyl, and $C_3$ to $C_{30}$ branched alkyl; and
$R^{13}$, $R^{14}$ and $R^{15}$ are independently selected from moieties represented by one of the following general structures (VII) and (VIII):

(VII)

(VIII)

wherein,
d ranges from 1 to 10; and
$R^{16}$, $R^{17}$, $R^{18}$, and $R^{19}$ are independently selected from hydrogen, $C_1$ to $C_{10}$ alkyl, and $C_3$ to $C_{30}$ branched alkyl.

4. The fiber-reinforced polymer composition of claim 3, wherein the sterically hindered phenol antioxidant has the general structure (VI).

5. The fiber-reinforced polymer composition of claim 2, wherein the sterically hindered phenol antioxidant includes tris(3,5-di-tert-butyl-4-hydroxybenzyl)-isocyanurate.

6. The fiber-reinforced polymer composition of claim 1, wherein the antioxidant includes a phosphite antioxidant.

7. The fiber-reinforced polymer composition of claim 6, wherein the phosphite antioxidant is an aryl diphosphite having the following general structure (IX):

(IX)

wherein,
$R_1$, $R_2$, $R_3$, $R_4$, $R_5$, $R_6$, $R_7$, $R_8$, $R_9$, and $R_{10}$ are independently selected from hydrogen, $C_1$ to $C_{10}$ alkyl, and $C_3$ to $C_{30}$ branched alkyl.

8. The fiber-reinforced polymer composition of claim 7, wherein the aryl diphosphite includes bis(2,4-dicumylphenyl)pentaerythritol diphosphite, bis(2,4-di-t-butylphenyl) pentaerythritol diphosphite, or a combination thereof.

9. The fiber-reinforced polymer composition of claim 1, wherein the antioxidant includes a thioester antioxidant.

10. The fiber-reinforced polymer composition of claim 9, wherein the thioester antioxidant is a thiocarboxylic acid ester having the following general structure:

wherein,
x and y are independently from 1 to 10; and
$R_{11}$ and $R_{12}$ are independently selected from linear or branched, $C_6$ to $C_{30}$ alkyl.

11. The fiber-reinforced polymer composition of claim 10, wherein the thiocarboxylic acid ester is distearyl thiodipropionate, dilauryl thiodipropionate, di-2-ethylhexyl-thiodipropionate, diisodecyl thiodipropionate, or a combination thereof.

12. The fiber-reinforced polymer composition of claim 1, wherein the stabilizer system includes a sterically hindered phenol antioxidant, phosphite antioxidant, and thioester antioxidant.

13. The fiber-reinforced polymer composition of claim 12, wherein the weight ratio of the phosphite antioxidant to the sterically hindered phenol antioxidant is from about 1:1 to about 5:1, the weight ratio of the thioester antioxidant to the sterically hindered phenol antioxidant is from about 2:1 to about 10:1, and/or the weight ratio of the thioester antioxidant to the hindered phenol antioxidant is from about 2:1 to about 10:1.

14. The fiber-reinforced polymer composition of claim 1, wherein the UV stabilizer includes a benzophenone.

15. The fiber-reinforced polymer composition of claim 12, wherein the benzophenone is a 2-hydroxybenzophenone.

16. The fiber-reinforced polymer composition of claim 1, wherein the carbon particles include carbon black.

17. The fiber-reinforced polymer composition of claim 1, wherein the carbon particles constitute from about 0.2 to about 2 wt. % of the polymer composition.

18. The fiber-reinforced polymer composition of claim 1, wherein the carbon particles constitute from about 0.3 to about 1 wt. % of the polymer composition.

19. The fiber-reinforced polymer composition of claim 1, wherein the carbon material includes a carrier resin.

20. The fiber-reinforced polymer composition of claim 1, further comprising a compatibilizer that includes a polyolefin modified with a polar functional group.

21. The fiber-reinforced polymer composition of claim 1, wherein the surface exhibits a ΔE value of from about 0.8 to about 2 after being exposed to UV light at a total exposure level of 2,500 kJ/m² according to SAE J2527_2017092.

22. The fiber-reinforced polymer composition of claim 1, wherein the composition exhibits a Charpy notched impact strength of about 15 kJ/m² or more, as determined according to ISO Test No. 179-1:2010 at a temperature of 23° C.

23. The fiber-reinforced polymer composition of claim 22, wherein after aging at a temperature of 150° C. for 1,000 hours, the composition exhibits a Charpy notched impact strength of about 15 kJ/m² or more as determined at a temperature of 23° C. in accordance with ISO Test No. 179-1:2010.

24. The fiber-reinforced polymer composition of claim 23, wherein the ratio of the Charpy notched impact strength after aging to the Charpy notched impact strength prior to aging is about 0.6 or more.

25. The fiber-reinforced polymer composition of claim 22, wherein after being exposed to UV light at a total exposure level of 2,500 kJ/m² according to SAE J2527_2017092, the composition exhibits a Charpy notched impact strength of about 15 kJ/m² or more as determined at a temperature of 23° C. in accordance with ISO Test No. 179-1:2010.

26. The fiber-reinforced polymer composition of claim 25, wherein the ratio of the Charpy notched impact strength after the exposure to UV light to the Charpy unnotched impact strength prior to the exposure to UV light is about 0.6 or more.

27. The fiber-reinforced polymer composition of claim 1, wherein the composition exhibits a tensile strength of from about 20 to about 300 MPa as determined at a temperature of 23° C. in accordance with ISO Test No. 527-1:2019.

28. The fiber-reinforced polymer composition of claim 27, wherein after aging at a temperature of 150° C. for 1,000 hours, the composition exhibits a tensile strength of from about 20 to about 300 MPa as determined at a temperature of 23° C. in accordance with ISO Test No. 527-1:2019.

29. The fiber-reinforced polymer composition of claim 28, wherein the ratio of the tensile strength after aging to the tensile strength prior to aging is about 0.6 or more.

30. The fiber-reinforced polymer composition of claim 27, wherein after being exposed to UV light at a total exposure level of 2,500 kJ/m² according to SAE J2527_2017092, the composition exhibits a tensile strength of from about 20 to about 300 MPa as determined at a temperature of 23° C. in accordance with ISO Test No. 527-1:2019.

31. The fiber-reinforced polymer composition of claim 28, wherein the ratio of the tensile strength after the exposure to UV light to the tensile strength prior to the exposure to UV light is about 0.6 or more.

32. The fiber-reinforced polymer composition of claim 1, wherein the fibers are glass fibers.

33. The fiber-reinforced polymer composition of claim 1, wherein the thermoplastic polymer includes a propylene polymer.

34. The fiber-reinforced polymer composition of claim 33, wherein the propylene polymer includes a homopolymer.

35. The fiber-reinforced polymer composition of claim 34, wherein the homopolymer is metallocene-catalyzed.

36. The fiber-reinforced polymer composition of claim 1, wherein the fibers are spaced apart and aligned in a substantially similar direction.

37. A shaped part that comprises the fiber-reinforced polymer composition of claim 1.

38. The shaped part of claim 28, wherein the part is injection molded.

39. An automotive part comprising the shaped part of claim 37.

40. The automotive part of claim 39, wherein the part is an interior automotive part.

41. The automotive part of claim 40, wherein the part is a pedal module, instrument panel, arm rest, console, seat structure, interior module, lift gate, interior organizer, step assist, ash tray, glove box, gear shift lever, or a combination thereof.

42. The automotive part of claim 39, wherein the automotive part is an exterior automotive part.

43. The automotive part of claim 42, wherein the exterior automotive part is a fan shroud, sunroof system, door panel, front end module, side body panel, underbody shield, bumper panel, cladding, cowl, spray nozzle body, capturing hose assembly, pillar cover, rocker panel, or a combination thereof.

* * * * *